Patented Feb. 8, 1949

2,460,844

UNITED STATES PATENT OFFICE 2,460,844

ACRYLONITRILE-VINYLIDENE CHLORO-FLUORIDE COPOLYMERS

Frank G. Pearson, Delaware County, Pa., assignor to American Viscose Corporation, Wilmington, Del., a corporation of Delaware No Drawing. Application July 29, 1943,
Serial No. 496,587

1 Claim. (Cl. 260—84)

This invention relates to copolymers of vinylidene chlorofluoride with vinyl cyanide.

In accordance with this invention, copolymerization of vinylidene chlorofluoride and acrylonitrile is performed by subjecting the mixture of monomers at room temperature up to about 50° C. while under sufficient pressure to maintain them in the liquid condition (the polymerization being effected in bulk, solution or emulsion) to ultraviolet light, or by carrying out the copolymerization in the presence of an organic or inorganic peroxygen catalyst such as benzoyl peroxide, or by subjecting the mixture to ultraviolet light in the presence of the catalyst.

Generally, the copolymers with acrylonitrile predominate in the acrylonitrile component, five or more mols of acrylonitrile being combined to each two mols of vinylidene chlorofluoride in the copolymer. Surprisingly, those copolymers which approach a proportion of two mols of vinylidene chlorofluoride to five mols of acrylonitrile are found to be soluble in acetone. This is unexpected, since the polymers of the individual monomers making up these copolymers are insoluble in acetone. In general, the introduction of the vinylidene chlorofluoride into a polyacrylonitrile as a polymerization monomer yields products having for a given degree of polymerization an increased solubility and fusibility as compared to the simple polymers of acrylonitrile. For many purposes, this increased solubility and fusibility renders the copolymers more readily workable, and imparts to products made therefrom special characteristics which are of advantage.

The following example is illustrative of the invention and represents a preferred embodiment of the procedure for making the copolymers:

Example 1

Into 100 parts by volume of water in a pressure vessel, 20 parts by volume of vinylidene chlorofluoride, 4 parts by volume of acrylonitrile, 1.5% by weight of a catalyst composed of a mixture of equal parts of benzoyl peroxide and tetraethyl lead, and 3% by weight of duponol (a higher fatty acid sulfate) were introduced. The vessel was sealed under pressure to maintain the liquid phase of the monomers at room temperature for a period of one week during which time it was constantly shaken. The copolymer resulting was a soft and friable white powder, which softened at 170° C. and became doughy at 190° C. About 200° C., the product showed progressive charring. The product contained two mols of vinylidene chlorofluoride combined in the copolymer with every five mols of acrylonitrile. The copolymer was soluble in acetone but insoluble in ether, chloroform, ethanol, isopropyl alcohol.

The copolymers of vinylidene chlorofluoride with acrylonitrile may be molded into structures of any desired shape and size, spun into filaments by wet or dry spinning, and used for making films, adhesives and coatings. There may be admixed with the copolymers prior to their conversion into shaped articles, fillers, pigments, dyes, plasticizers and other synthetic resins. Before or after conversion of the copolymers into shaped articles, they may be subjected to partial hydrolysis by conventional methods to produce copolymers in which at least a portion of the cyanide groups are replaced with amide or carboxyl groups, thereby enabling the introduction of hydrophylic properties to any desired extent.

It is to be understood that changes and variations may be made without departing from the spirit and scope of the invention as defined by the appended claim.

I claim:

A material comprising a copolymer of vinylidene chlorofluoride and acrylonitrile in which for every five mols of acrylonitrile there are combined two mols of vinylidene chlorofluoride, said copolymer having a softening point of about 170° C.

FRANK G. PEARSON.

REFERENCES CITED

The following references are of record in the file of this patent:

UNITED STATES PATENTS

| Number | Name | Date |
|---|---|---|
| 2,160,935 | Wiley | June 6, 1939 |
| 2,160,943 | Britton et al. | June 6, 1939 |
| 2,238,020 | Hanson et al. | Apr. 8, 1941 |
| 2,278,415 | Arnold | Apr. 7, 1942 |
| 2,281,768 | Heerema | May 5, 1942 |
| 2,328,510 | Thomas | Aug. 31, 1943 |

FOREIGN PATENTS

| Number | Country | Date |
|---|---|---|
| 477,523 | Great Britain | Jan. 3, 1938 |

Certificate of Correction

February 8, 1949.

Patent No. 2,460,844.

FRANK G. PEARSON

It is hereby certified that error appears in the printed specification of the above numbered patent requiring correction as follows:

Column 1, line 46, Example 1, for the word "acid" read *alcohol*; and that the said Letters Patent should be read with this correction therein that the same may conform to the record of the case in the Patent Office.

Signed and sealed this 18th day of October, A. D. 1949.

[SEAL]

THOMAS F. MURPHY,
*Assistant Commissioner of Patents.*